United States Patent
Kaminski

[11] Patent Number: 6,006,341
[45] Date of Patent: Dec. 21, 1999

[54] BUS ARRANGEMENT RELATED TO A MAGAZINE

[75] Inventor: Krzysztof Kaminski, Tullinge, Sweden

[73] Assignee: Telefonaktiebolaget LM Ericsson, Stockholm, Sweden

[21] Appl. No.: 08/849,754

[22] PCT Filed: Dec. 12, 1995

[86] PCT No.: PCT/SE95/01499

§ 371 Date: Jun. 17, 1997

§ 102(e) Date: Jun. 17, 1997

[87] PCT Pub. No.: WO96/21188

PCT Pub. Date: Jul. 11, 1996

[30] Foreign Application Priority Data

Dec. 29, 1994 [SE] Sweden .................................. 9404556

[51] Int. Cl.[6] .................................................. G06F 11/00
[52] U.S. Cl. .......................................... 714/3; 395/500.05
[58] Field of Search ........................... 395/182.01, 181, 395/182.05, 182.09, 182.11, 183.01, 183.13, 183.15, 183.19, 185.01, 185.08, 500.05; 371/10.2, 68.1, 49.2; 714/1, 2, 3, 5, 6, 8, 18, 25, 27, 47, 56

[56] References Cited

U.S. PATENT DOCUMENTS

| | | | |
|---|---|---|---|
| 4,412,281 | 10/1983 | Works ....................................... | 364/200 |
| 4,420,793 | 12/1983 | Strandberg .............................. | 361/413 |
| 4,453,215 | 6/1984 | Reid ......................................... | 364/200 |
| 4,458,972 | 7/1984 | Malmberg et al. ....................... | 339/91 |
| 4,486,826 | 12/1984 | Wolff et al. .............................. | 364/200 |
| 4,597,084 | 6/1986 | Dynneson et al. ....................... | 371/51 |
| 4,750,177 | 6/1988 | Hendrie et al. ........................... | 371/32 |
| 4,988,180 | 1/1991 | Gabas ....................................... | 350/641 |
| 5,006,961 | 4/1991 | Monico .................................... | 361/413 |
| 5,065,314 | 11/1991 | Maskovyak .............................. | 395/325 |
| 5,247,522 | 9/1993 | Reiff ........................................ | 371/29.5 |
| 5,450,425 | 9/1995 | Gunn et al. .............................. | 371/67.1 |
| 5,455,917 | 10/1995 | Holeman et al. ........................ | 395/287 |
| 5,600,786 | 2/1997 | Baker et al. ......................... | 395/182.09 |
| 5,664,221 | 9/1997 | Amberg et al. .......................... | 395/829 |

FOREIGN PATENT DOCUMENTS

| | | |
|---|---|---|
| 0065273 | 11/1982 | European Pat. Off. . |
| 0077153 | 3/1987 | European Pat. Off. . |
| 0226765 | 7/1987 | European Pat. Off. . |
| 0301499 | 2/1989 | European Pat. Off. . |
| 0302351 | 2/1989 | European Pat. Off. . |
| 0488057 | 6/1992 | European Pat. Off. . |
| 4-302333 | 10/1992 | Japan . |
| 94/14026 | 6/1994 | WIPO . |
| WO 94/03901 | 8/1994 | WIPO . |

*Primary Examiner*—Robert W. Beausoliel, Jr.
*Assistant Examiner*—Nadeem Iqbal
*Attorney, Agent, or Firm*—Burns, Doane, Swecker & Mathis, L.L.P.

[57] ABSTRACT

The invention relates to a magazine-related bus arrangement, wherein the magazine includes a backplane (1*a*) having electric contact fields and means for holding a number of circuit boards having edge-related electric contact surfaces in electric coaction with respective contact fields, adapted to enable the exchange of information-carrying signals between one or more first circuit arrays (102) belonging to a first circuit board (10), and one or more other circuit arrays (112) belonging to one or more second circuit boards (11). The logical number of bus-related conductors (m+n) with reserve conductors (n) slightly exceeds the numbers (m) necessarily required for a chosen signalling system and a non-error-tolerant signal exchange.

43 Claims, 3 Drawing Sheets

BUS ARRANGEMENT RELATED TO A MAGAZINE

TECHNICAL FIELD

The present invention relates to a magazine-related bus arrangement.

Earlier known magazine-related bus arrangements can be considered to comprise physically a number of backplane-related bus conductors, connected mechanically and electrically to backplane-related electrical contact devices which are coordinated with circuit board locations and which are orientated in columns and/or rows and form electric contact fields.

A selected number of bus conductors are disposed for signal transmission with a parallel signal structure.

The backplane-related electric contact devices are intended to coact with electric contact devices provided along one edge of a board with printed circuits, a circuit board.

A plurality of such circuit boards are positioned side-by-side and each circuit board coacts with a respective backplane-related electric contact field so that a first circuit mounted on a circuit board is able to transmit signals to and receive signals from other circuits on one or more other circuit boards or vice versa, through the medium of bus conductors.

A magazine-related bus arrangement can logically be considered to consist of bus conductors and backplane-related electric contact devices and circuit-board associated electric contact surfaces and circuit-board related transmitter/receiver circuits associated with respective bus conductors.

Magazine-related bus arrangements of the category defined in the introduction are based on the use of a plurality of conductors extending at least between two electronic circuit arrangements, on which information is transmitted n parallel between the conductor-coupled circuit arrangements, normally in the form of digital signals.

Thus, a magazine to which the characteristic features of the invention can be applied will comprise a backplane having electric contact fields disposed in parallel columns (or rows), circuit boards capable of coating with said electric contact fields, and known means for maintaining one or more circuit boards having edge-related electric contact surfaces in mechanical and electrical coaction with respective columns of electric contact fields.

The electric contact fields include a column (or row) of electric contact devices with, among other things, a predetermined number of bus conductors with associated bus-related electric contact devices, said predetermined number being contingent on the signalling system and signal exchange concerned, wherein each of said electric contact devices is adapted for coaction with a corresponding bus-related, edge-disposed contact device on a circuit board inserted into the magazine.

The bus conductors are present in the least possible number, so as to afford non-redundant and non-error-tolerant parallel signal transmission of the digital signals.

One or more further group of bus connections can be used as redundant bus conductors for non-redundant parallel signal transmission, and further connections or conductors can be used for other signal exchanges, such as a signal exchange of lower priority than the applicable to the bus conductors.

The bus arrangement is designed to afford, via the backplane bus conductors, an information-carrying signal exchange between a first circuit array belonging to a first circuit board and one or more second circuit arrays belonging to one or more second circuit boards.

Thus, a number of bus-related parallel conductors are coupled together in the backplane with bus-related electric contact circuits for coaction with the circuit boards when said boards are in coaction with the backplane.

DEFINITIONS

So that the following description will be understood more easily, a definition is given below of the terms used in the description and in the Claims, although it will be understood that these definitions have no limiting effect on the scope of the invention.

Contact spring The electric contact device allocated to the backplane of the magazine and providing mechanical and electrical contact with the electric contact devices on the circuit board. The electric contact devices are normally coordinated in columns/or rows to form circuit board contact fields.

Contact surface The contact device provided on an edge part of a circuit board and providing mechanical and electric contact with a contact spring. The contact devices are normally coordinated to electric contact surfaces so as to form an electric contact field.

Lines The physical metal lines incorporated in the backplane and functioning to transfer pulsed information-carrying signals between circuit boards.

Conductor The means by which pulsed information-carrying signal can be sent between transmitter and receiver. This means may be one or more lines formed in the backplane or in the circuit board.

Bus arrangement May either be a physical bus arrangement or a logic bus arrangement.

Bus conductors The number of conductors temporarily used for parallel transmission of information-carrying signals under non-error-tolerant conditions.

Reserve conductors The number of bus-related conductors that can be used in the event of an (fault) on one or more bus conductors to provide error-tolerant conditions. (These conductors are also referred to as redundant conductors).

It will be understood that although the present invention is described by inferring that each contact field in the backplane is comprised of contact springs, and that the circuit board is provided with one or more rows of contact surfaces, this has been done with the intention of defining the invention more simply and with the intention of distinguishing backplane-related functions from circuit-board related contact functions, and that these expressions shall not be taken to restrict the present invention constructively.

The present invention is intended particularly to provide a magazine-related bus arrangement with the possible of providing an error-tolerant signalling system and signal exchange.

BACKGROUND ART

The construction of a signalling system and the creation of a signal exchange tolerant to occurrent errors in a circuit board or bus arrangement are known to the art in several different forms and constitute a basic requisite for the functioning of a complicated electronic system.

Errors in digital data systems are practically unavoidable and are due, at least partly, to the complexity of the circuits and circuit arrangements used and the complexity of associated electronic and electromechanical components.

By way of an example of the earlier standpoint of techniques in the present context, reference is made to International Patent Publication WO 94/03901 (International Patent Application PCT/US93/07262), which illustrates and describes in error-tolerant, high-speed bus system in an integrated circuit application (wafer scale integration). In this known construction, the bus arrangement includes a plurality of bus lines coordinated in a number of sections or segments and mutually linked via programmable bus couplers. The segments are mutually identical and each segment contains thirteen signal lines.

The International Patent Publication WO 94/14026 (international Patent Application PCT/US93/11343) teaches a data collecting system which utilizes a plurality of parallel data buses (A, B, C) connected to a central control unit (10) and each sensor (14, 15, 16) can be connected to the central control unit (10) over any one of the data buses, through an addressing procedure.

An error in one of the data busses (A, B, C) creates conditions under which the faulty data bus is blocked or by-passed, by using a faultless parallel data bus. The European patent application, Publication EP-A2-0 065 273 teaches a system for mutually coupling a plurality of data systems with the aid of a bus system which has information conductors and control conductors. This publication recommends that the requisite smallest number of control conductors shall be increased manifold, in order to obtain rapid notation of an error and a simple error tolerance.

European Patent Pulibcation EP-B1-0 077 153 teaches digital equipment and methods for achieving essentially continuous operation even when several error conditions occur.

This latter publication proposes that the bus structure within each processor module shall include duplicated bus structures, and that each functional unit may have a duplicated partner unit. When establishing an error, the process module is instrumental in isolating the bus or the unit that causes the error, by allowing information to be transferred to the other unit or module.

U.S. Pat. No. 4,412,281; 4,486,826; 4,453,251; 4,597,084; 4,750,177; and 5,247,522 also form part of the earlier standpoint of techniques.

With regard to magazine-related bus arrangements, to which technique the present invention refers, it is known from European Patent Publication EP-A2-0 302 351 to create conditions for building a number of complete bus arrangements in the backplane and to coordinate one or more of said bus arrangements with different circuit boards.

In this respect, it is necessary for the number of coordinated contact springs to correspond with the number of bus conductors in each coordinated group and for the number of bus conductors to be chosen to correspond to the least possible number of bus conductors so as to provide parallel signal transmission of the digital signals under non-redundant conditions.

The disclosures made in European Patent Publications EP-A1-0 488 057, EP-A2-0 301 499 and EP-A2-0 226 765 and the U.S. Pat. Nos. 5,006,961, 4,988,180 also belong to the earlier standpoint of techniques.

When summarizing the aforesaid known prior art, it can be said that it is known to create redundant bus arrangements in magazine-related bus arrangements of the kind to which the present invention relates, by using duplicated by triplicated complete bus arrangements or bus arrangements increased to an N-value, each exhibiting non-redundant and non-error-tolerant conditions.

Duplicated bus arrangements are chosen in those coupling arrangements with which it has been elected to substitute a utilized complete bus arrangement with a reserve complete bus arrangement when the first mentioned bus arrangement is afflicted with an error of a more or a less serious nature.

Triplicated bus arrangements have been used in applications where the requirements placed on reliability are extremely high and where is high error tolerance is required.

SUMMARY OF THE INVENTION

TECHNICAL PROBLEMS

When considering the earlier standpoint of techniques as expressed in the above statement and the technical field to which the invention relates, it will be seen that a technical problem is one of creating conditions which obviate the necessity of using a complete redundant bus arrangement or of using coordinated bus conductors to achieve a desired redundancy in the event of errors which render one or more bus-associated conductors unusable, and such that all that is needed is to activate one or more bus-related, but free, reserve conductors.

Another technical problem resides in the ability to establish that a majority of errors that occur in backplane-related bus conductors of a magazine are the result of errors in single conductors, and then particularly transmitter/receiver circuits connected thereto, and to realize that a redundant system requires one or few bus-arrangement associated reserve conductors in respect of such errors.

Another technical problem is one of realizing the significance of proportioning the number of reserve conductors to a selected redundancy and anticipated error structures, and in realizing that a redundant bus-arrangement may well be proportioned to take this into account solely by using a selected bus-related reserve conductor in the event of a faulty bus conductor.

Another technical problem is one of providing an error-tolerate bus-arrangement for parallel transmission of digital signals and information while taking into consideration that single occurrent errors are normally caused by errors in board-associated transmitted/receiver circuits, and that a satisfactory error-tolerant bus system actually requires only a small number of redundant or unoccupied bus-related reserve conductors, this number of reserve conductors being far less than the number required by a non-error-tolerant bus arrangement.

Another technical problem is one of providing an error-tolerant bus arrangement which, in relation to known techniques, is able to save space in the contact fields in the backplane and also save space in the backplane, by virtue of enabling the number of reserve conductors required in an effective error-tolerant system to only slightly exceed the number of bus conductors required for a normal bus connection which lacks error tolerance.

In the case of systems that have the need for duplicated or triplicated complete bus arrangements, another technical problem resides in providing an error-tolerant bus arrangement that has good error tolerance and the ability to save surfaces on all the edge parts of a circuit board for electrical coaction with contact springs of the backplane contact field by virtue of requiring a smaller number of contact surfaces against the backplane contact springs.

Another technical problem resides in creating an error-tolerant bus arrangement in which the number of circuit board-related and necessary transmitter/receiver circuits are greatly reduced in comparison with known techniques.

When considering the state of the prior art as described above, it will also be seen that a technical problem resides in providing a magazine-related bus arrangement which is error tolerant when an error is discovered on one or more bus-conductors or capsule-related bus conductors (such as eight or nine-conductors) therewith obviating the need to provide conditions for duplicating or triplicating the complete bus arrangement.

It will also be seen that a technical problem resides in realizing the need to create conditions which will enable the number of logic bus arrangements selected to slightly exceed the number necessarily required for a chosen signalling system and signal exchange in a non-tolerant configuration and therewith release for use a large number, say one-hundred, bus conductors, contact springs, contact surfaces and transmitter/receiver circuits that would otherwise be required for complete duplication or triplication of a bus arrangement.

In view of the present state of the art, a further technical problem will be seen to exist in providing an error-tolerant bus arrangement while considering the aforesaid limitation in the number of requisite bus conductors and reserve conductors, and to create, with the aid of simple means, different requirements with regard to a chosen error-tolerance level and to adapt the number of reserve conductors to the structure and the anticipated frequency of selected error indications.

It will also be seen that a further technical problem is one of realizing the significance of creating possibilities of using circuit board-associated monitoring circuits.

In addition, it will be seen that a technical problem resides in creating an error-tolerant bus-arrangement which can be tested with regard to errors on one or more of the bus conductors during information-carrying signal transmission via the bus arrangement and which also provides a test cycle of a different kind during the short time section in which no signal transmission takes place.

It will also be seen that a technical problem is one of realizing the significance of and the simplicity in testing the bus conductors and reserve conductors of the bus arrangement during a signal transmission process, by alternating between available bus conductors and reserve conductors, so that when a free reserve conductor is seized, one of the earlier used bus conductors is marked as being occupied, and developing the principle so that all bus conductors and reserve conductors will be used discontinuously.

Irrespective of the test method, it will be seen that a technical problem resides in the ability to detect signal exchange adapted for error localization on each of said bus conductors with the aid of simple and well-defined procedures, and when establishing an error in one such detected signal exchange on one of the bus conductors creating conditions which point-out and block or bypass solely the indicated bus conductor and instead couple that part of the signal exchange to another bus conductor which serves as an unoccupied reserve conductor and on which no error is found.

It will also be seen that a technical problem resides in the to choose the number of logic bus conductors with as few as possible reserve conductors within the framework of a selected error tolerance, in accordance with a special application.

It will also be seen that a technical problem resides in realizing the necessity of and the advantages afforded by using a monitoring circuit, and, in addition, to create conditions which will allow monitoring to be effected during normal operation of all bus-associated conductors and reserve conductors, or enable a monitoring routine to be applied when disconnecting bus-associated conductors.

It will also be seen that when monitoring during normal operation a technical problem residues in the significance of and the advantages afforded by using solely the requisite number of bus conductors without error-tolerant configuration and to allow certain reserve conductors to be free (or used for other signal transmissions) and shift cyclically around all conductors belonging to the bus arrangement, by releasing one bus conductor and seizing a reserve conductor, wherein the thus freed, errorless bus conductor becomes a reserve conductor and the seized reserve conductor becomes a bus conductor.

It will also be seen that a technical problem resides in creating with the aid of simple means conditions which will enable the reserve conductors not used for the parallel signal exchange to be used for other signal transmissions.

Another technical problem is one of realizing the significance of and the advantages that are afforded by using such reserve conductors for non-critical signal transmissions, such as parity bits, error-indicating codes, etc.

In addition, it will be seen that a technical problem resides in realizing the advantages that are afforded when using a known, specific connecting circuit and controlling said circuit so that each of the input conductors can be coupled to one of the available output conductors, and vice versa.

Another technical problem resides in the significance of allowing the choice of the coupling of associated I/O cells to be stored in a memory circuit.

Another technical problem is one of realizing the advantages that are afforded by influencing the connecting circuit through the medium of a control circuit such as to alternate said connecting circuit between group-related connecting conductors, of which one group may be a first type of transmitter/receiver circuits and other or more group-related connecting conductors, and where another group may be a second type of transmitter/receiver circuits.

SOLUTION

With the intention of solving one or more of the aforesaid technical problems, there is proposed in accordance with the present invention a logic magazine-related bus arrangement wherein one such magazine includes a backplane having columns of contact fields with which edge-disposed contact surfaces on a circuit board are intended to coact mechanically and electrically, and means for maintaining a number of circuit boards having edge-related contact surfaces in electric coaction with respective columns of contact fields, and wherein the contact fields include a predetermined number of bus-related contact springs, said number being contingent on the signalling system and signal exchange utilized, wherein each of said contact springs is adapted for coaction with a corresponding bus-related contact surface on the edge of a circuit board inserted into the magazine.

The bus arrangement is constructed to enable an information-carrying signal exchange to be effected between a first circuit array belonging to a first circuit board, and one or more other circuit arrays, belonging to a second, third, etc., circuit board.

In accordance with the present invention, the number of logic bus-related conductors in one such magazine-related bus arrangement is chosen so that said number will only slightly exceed the number of conductors that is necessarily required for a chosen signalling system and signal exchange, with associated reserve conductors, having a non-error-tolerant configuration.

In accordance with proposed embodiments that lie within the scope of the invention, it is proposed that first monitoring circuits are provided for detecting occurrent signal exchange on said bus conductors and that when an error is established in a detected signal exchange on one of the bus conductors used, this bus conductor is bypassed and another bus conductor, a reserved and unoccupied bus conductor, is coupled so as to provide an error-tolerant information-carrying signal exchange.

It is also proposed that other monitoring circuits are constructed to generate a predetermined signal structure in the event of an information-carrying signal exchange being disconnected, and to transmit this predetermined signal structure via used bus conductors and receive said signal structure, wherein when establishing an error in a detected signal structure on one of the bus conductors used, this bus conductor is by-passed and another bus conductor, a reserved and unoccupied bus conductor, is connected so as to provide an error-tolerant information-carrying signal exchange.

The chosen number of reserve conductors shall be adapted to the forecasted number of error functions, the nature of the errors and to safety requirements.

A collective assessment in this regard indicates that the number of logic bus-related reserve conductors that exceeds the smallest number required for a non-error-tolerant signal exchange is at least one conductor and is chosen to be less than 30% of the least number of bus conductors required.

The selected number will preferably correspond to or be slightly greater than the number of lines or conductors coordinated in a capsule.

According to preferred embodiments lying within the scope of the inventive concept, the number of reserve conductors exceeds a necessary smallest number of bus conductors for a requisite signalling system and signal exchange and is less than twenty, preferably less than four.

According to one embodiment, the monitoring circuit is constructed to influence a circuit board-associated or backplane-associated connecting or coupling circuit, wherein the connecting circuit is advantageously a known FPID circuit.

The choice of a combination of the I/O cells belonging to the connecting circuit can be stored in a memory circuit that can be reconfigured during operation. Such a memory circuit may advantageously consist of a memory section of the FPID circuit used.

It is also proposed that used standardized bus conductors, without error-tolerant signal exchange, can be switched cyclically around the number of total available bus conductors, i.e., the number of standardized bus conductors and chosen number of reserve conductors.

It is also proposed that the reserve conductors necessary for an error-tolerant signal exchange and not used for the parallel-related signal exchange shall be used for other signal transmissions, such as parity, while taking into account that the number of available conductors decreases with errors on the bus conductors.

It is also proposed that the connecting circuit is duplicated, so as to provide a redundant system which protects against an error in the one FPID circuit.

ADVANTAGES

Those advantages primarily afforded by an inventive magazine-related bus arrangement reside in the creation of conditions which avoid the duplication or triplication of complete bus arrangements while maintaining an error-tolerant system and bus arrangement, by providing in addition to the bus conductors necessary for the signal structure without error tolerance, a very small number of reserve conductors which can be connected-up in the event of an error on one or more of the requisite bus conductors.

Compared with known techniques, the invention provides a saving of logic conductors and enables reserve conductors to be used as circuit connections for other purposes.

Furthermore, the invention includes the provision of monitoring circuits by means of which the information-carrying signal structure can be controlled under operating conditions, or by means of which a signal structure can be controlled when the conductors of the bus arrangement are temporarily disconnected.

The primary characteristic features of an inventive magazine-related bus arrangement are set forth in the characterizing clause of the following Claim 1.

BRIEF DESCRIPTION OF THE DRAWINGS

The present invention will now be described in more detail with reference to a preferred embodiment of a magazine-related bus arrangement and also with reference to the accompanying drawings, in which.

DESCRIPTION OF AN EMBODIMENT AT PRESENT PREFERRED

Figure 1:
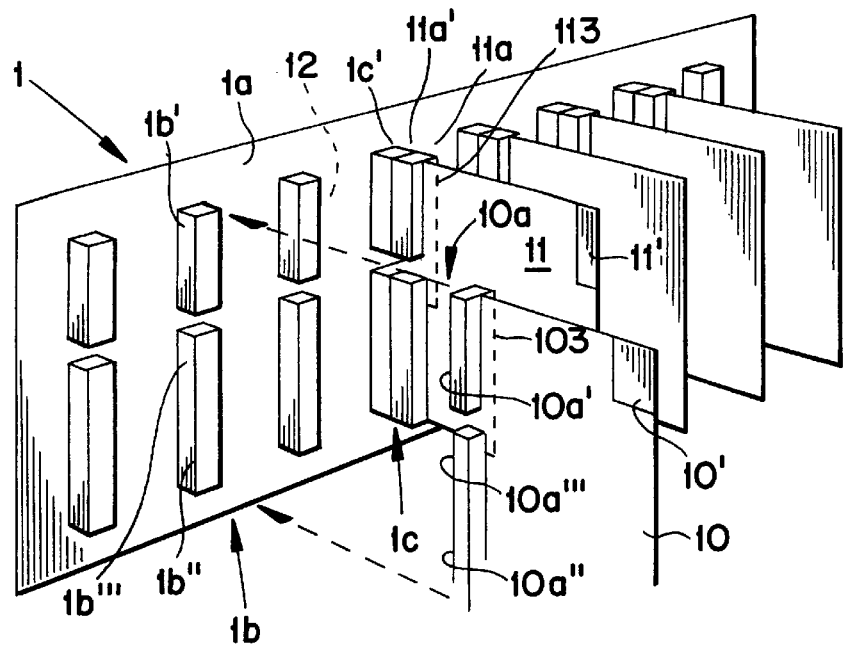
FIG. 1 is a greatly simplified perspective view of a magazine which includes a backplane and houses a number of circuit boards.

FIG. 1 is a highly simplified perspective view of a magazine 1 having a backplane 1a on which there is mounted a number of parallel columns (or rows) of electric contact fields, of which two columns are referenced 1b and 1c.

Although not shown, the magazine 1 will normally have side walls.

The illustrated magazine 1 may have contact fields (1b, 1c) disposed in rows on one side of the backplane and in columns on the other side thereof.

The inventive concept is essentially independent of the mutual orientation of the contact fields.

Bus lines (not shown) in the backplane are disposed to enable an information-carrying signal to be transferred from one or more circuit boards to one or more other circuit boards, or vice versa.

For the sake of simplicity, only two circuit boards 10 and 11 will be described, since the characteristics of the invention will be clearly apparent from this simplification.

Figure 3:
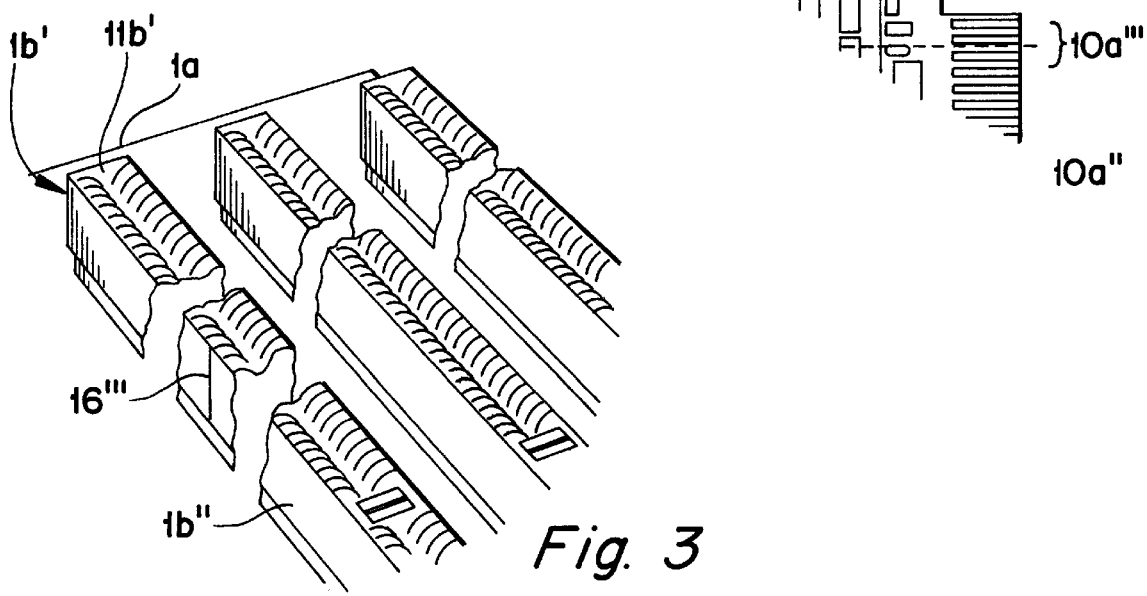
FIG. 3 is a perspective view of a backplane having a number of columns of contact fields and bus-related contact springs.

The illustrated columns of contact fields may have a configuration according to FIG. 3, this configuration not being shown in detail in FIG. 1 for clarification purposes.

Although not shown, the magazine will include means for holding a plurality of circuit boards, such as a rail in a bottom wall parts and a rail in a top wall part. Two such circuit boards have been shown side-by-side and referenced 10 and 11 respectively.

The circuit board 11 with its edge-related electric contact surfaces 11$a$ is shown in electrical coaction with its contact springs on the contact field column 1$c$.

Although the invention requires a number of circuit boards to be in coaction with their respective contact springs in the backplane, FIG. 1 shows a circuit board 10 in a position where a collection of electric contact devices or contact springs 1$b'$ in the contact field 1$b$ can be brought into coaction with a collected array of contact surfaces 10$a'$ within the contact surfaces 1$a$, while a collected array of contact springs 1$b''$ can be brought into coaction with a collected array of contact surfaces 10$a''$.

The following description is based on the assumption that the contact surfaces 11$a$ of the circuit board 11 are structured in the same way as that shown for the circuit board 10 and that said circuit board 10 is caused to coact with the contact field 1$b$.

It will be understood that even though the following description refers to a specific collection of contact springs 1$b'$ which are joined in the backplane to a number of bus lines where said number corresponds to a non-error-tolerant configuration, the construction used in practice may differ from the illustrated construction.

The backplane 1$a$ may carry a bus structure that has a number of bus conductors in a non-error-tolerant configuration, this bus structure requiring 153 bus conductors in a FUTUREBUS application.

The backplane 1$a$ may also present in its layers a similar number or a different number of parallel bus lines for a similar or a different complete bus structure.

In order to provide an error-tolerant information-carrying signal exchange, earlier known techniques have enabled one or more complete redundant bus arrangements to be related to the contact spring array 1$b''$.

By way of a simple example, FIG. 1 shows that each contact field, such as contact springs 1$b$, include a predetermined number of bus-related contact springs 1$b'$ having a non-error-tolerant configuration and being dependent on the signalling system and signal exchange employed, wherein each of said contact springs 1$b'$ is adapted for coaction with a corresponding bus-related and circuit board-associated edge-disposed contact surface, wherein a plurality of such contact surfaces form a surface section 10$a'$ which is side-related to a circuit board 10 inserted into the magazine.

The illustrated embodiment also includes a number of contact springs 1$b''$. Certain of these contact springs, outside a base structure, may be intended for a signalling and signal exchange, such as control signals that are not intended for the bus, voltage supply, earth potential connection, etc.

The springs may also include a set of contact springs that are intended for connection to another set of bus conductors which serve as a complete redundant bus structure.

The present invention also provides a magazine-related bus arrangement which is adapted to enable redundant information-carrying signal exchange between a first circuit array belonging to a first circuit board 10, and a second circuit array belonging to a second circuit board 11, where the circuit arrays are shown mounted on solely the circuit boards 10 and 11, within the surfaces 10', 11'.

It will be understood by one skilled in this art that the surface 10', 11' may represent different circuit arrays and circuit solutions, although these have not been illustrated because they do not assist in understanding the present invention.

It will also be understood that more circuit boards than the two illustrated circuit boards may be connected to the bus conductors for the exchange of signals between one or more circuit boards and between one or more other circuit boards.

Figure 2:
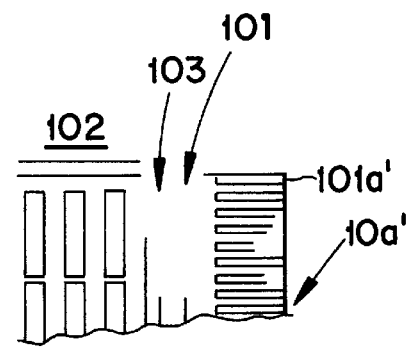
FIG. 2 illustrates part of a circuit board from above, said board having edge-related parallel contact surfaces.

With regard to the aforedescribed practical application, it can therefore be assumed that the embodiment illustrated in FIG. 2 has 153 side-orientated contact surfaces which form an edge-orientated surface section 10$a'$.

Each of the surfaces, such as the surface 101$a'$, shall be capable of coacting with a respective contact spring, such as the contact spring 11$b'$, within the section 1$b'$.

In the illustrated embodiment, the number of contact springs 11$b'$ is assumed to correspond to the number of contact surfaces (101$a'$), this number being contingent on the signalling system and signal exchange used, in a non-error-tolerant configuration.

According to the present invention, non-error-tolerant information-carrying signal exchange takes place over a smallest number of selected bus conductors, provided that the signal exchange takes place correctly. However, in the event of an error on one logic bus conductor, the system is made error-tolerant by by-passing the bus conductor on which the error occurs and coupling-in a reserve bus conductor.

The number of reserve-related bus conductors is small in relation to a complete redundant bus arrangement, as will be apparent from the following description.

According to the invention, the total number of logic bus conductors in the backplane 1$a$ is chosen so that, together with a number of reserve conductors, said number will only slightly exceed the number of bus conductors that are necessary or a chosen signalling system and signal exchange, but a non-error-tolerant configuration when the number of reserve conductors is contingent on chosen safety factors.

The number of reserve conductors that shall exceed the smallest possible number of bus-related conductors for effecting signal exchange is contingent on the anticipated error frequency, the error structure that can be expected, and the applicable safety factor.

This implies that in a practical application with normally high standard requirements, the number of additional redundant contact surfaces 10$a'''$ and additional redundant contact springs 1$b'''$ will be more than one but less than 30% of the smallest number of bus conductors required for the bus arrangement without error tolerance.

It will be noted in this regard that the number of reserve conductors corresponds to the number of contact springs 10$a'''$ and contact springs 1$b'''$, and that these are taken from the number for the contact arrays 10$a''$ and 1$b''$.

It can be expected that those errors that primarily occur are errors on a transmitter and/or receiver, in which case only the bus conductor on which the error occurs is by-passed and a free reserve conductor coupled-in instead.

When it is necessary to take into consideration the possibility of errors occurring on all capsule-related conductors simultaneously, it is, of course, necessary to provide a number of reserve conductors which will handle a total capsule error and also errors on single conductors.

Depending on the error structures that can be accepted within the framework of the error tolerance, the number of reserve conductors will be less than twenty, and in some cases less than four.

In the example illustrated in FIGS. 2 and 3, the reserve conductors are three in number (10a''', and 1b''') and are placed uppermost in the contact arrays 10a'' and 1b'' respectively.

Figure 4:
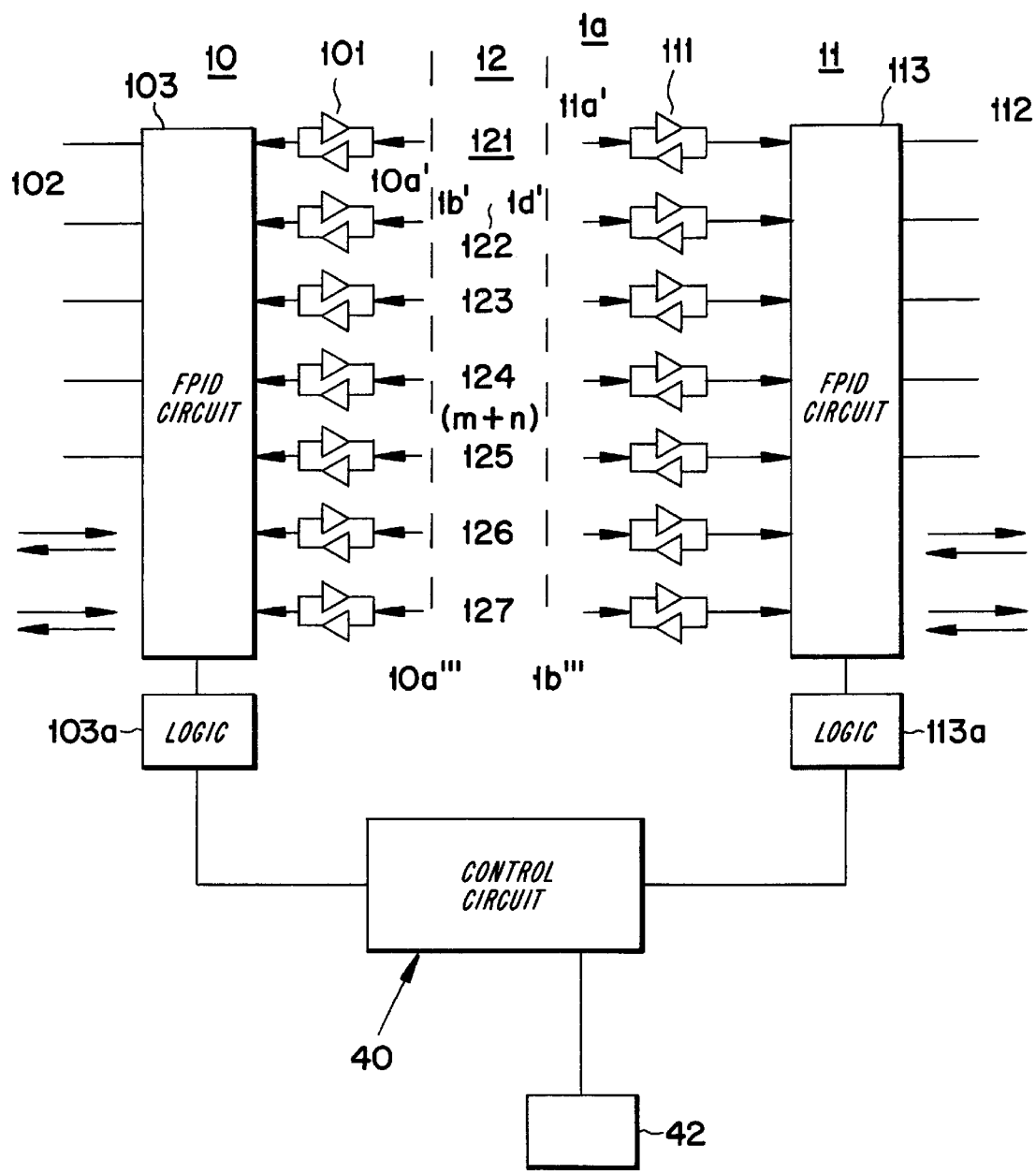
FIG. 4 illustrates schematically an electrical terminal drawing relating to an inventive bus arrangement and including a logic monitoring function which is active during a normal error-tolerant information-carrying signal exchange.

FIG. 4 illustrates in more detail an electric coupling arrangement for coupling electrically and mechanically a circuit board 10 with a circuit board 11 over a bus conductor 12 with the number of bus conductors (m), via a backplane 1a. For the sake of clarity, the number of bus conductors (m) for a non-error-tolerant signal exchange are five in number and the reserve conductors (n) are two in number.

Figure 5:
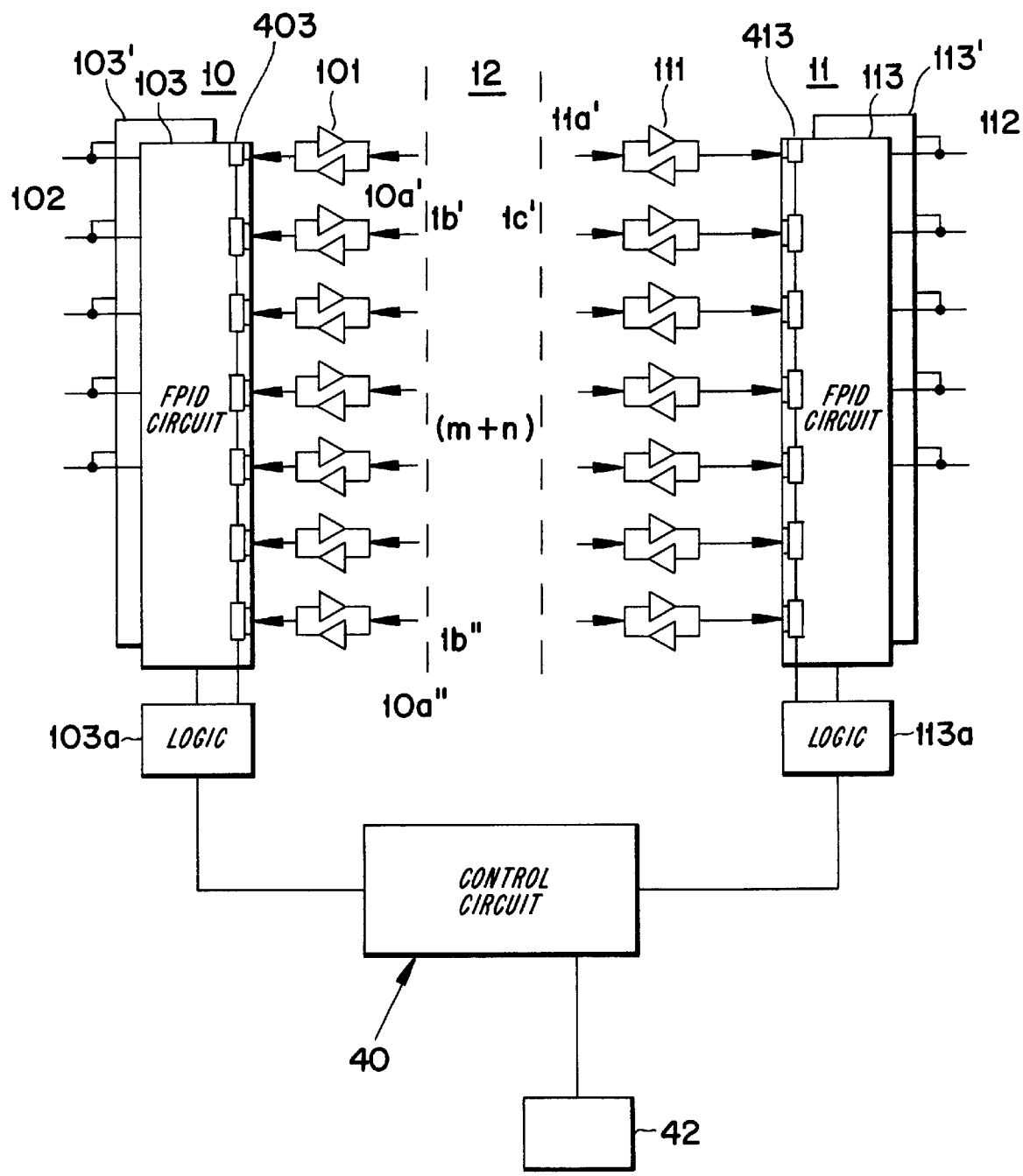
FIG. 5 illustrates schematically an electrical terminal drawing relating to an inventive bus arrangement and including a monitoring circuit which is active during the time in which the signal exchange has temporarily ceased.

In the case of the FIG. 4 illustration, and also the FIG. 5 illustration, the total number of available bus conductors equals "m+n", where "m" signifies the number of bus conductors required by a parallel bus arrangement in a non-error-tolerant configuration, and "n" signifies the number of redundant reserve conductors that are available and can be seized the achieve a certain desired reliability.

Each bus-related conductor (m) coacts with a transmitter/receiver circuit 101 on the circuit board 10, and with a receiver/transmitter circuit 111 on the circuit board 11, so as to enable the two-way transfer of signals on a conductor 121.

A circuit board-related connecting circuit 103, a so-called FPID circuit, is connected between bus driver circuits, transmitter/receiver circuits 101, a pair for each bus conductor, and an application logic 102 which can be considered to correspond to the region 10' on the circuit board 10.

An FPID circuit is retained by I-Cube Inc., Santa Clara, Calif., U.S.A. and is produced in 0.8 $\mu$m CMOS technique and uses transistor switches, each of which can be controlled or programmed through the medium of an SRAM cell.

When programmed to be in its ON position, each switch functions to couple together a unique pair of signal lines in a gate sea. External I/O signals are connected to conductors in the gate sea.

A connection is effected between two I/O ports, by closing the transistor switch at the junction point of the switch conductors.

The connecting circuit 103 thus functions as a general switch, where a selected input can be programmed to be connected to a selected output with an input signal.

Programming of the circuit 103 and the control and activation of said circuit will be obvious to one of normal skill in this art.

According to the present invention. FPID circuits shall be controlled so that an input signal on one input can be coupled to a selected available output of several available outputs, and vice versa.

This requires the provision of a circuit board-associated logic 103a and 113a that can be controlled by a control circuit 40.

Programmed of how the circuit 103 is momentarily configured can be stored in a memory, a so-called SRAM memory.

The circuit board 11 is also equipped with a number of bus driver circuits 111, an application logic 112 and an intermediate-connected connecting circuit 113, in the same way as that described earlier with reference to the circuit board 10, and will not therefore be described in detail.

The circuits 103 and 113 can be re-programmed in operation by the control circuit 40, and via the SRAM memory, so as to enable the connection configuration to be changed.

According to the invention, only "m" number of conductors will be used at any one time from the chosen "m+n" number of conductors for the bus 12.

The number "m" is intended to illustrate the normal breadth of the parallel bus without error-tolerant configuration, and the signal exchange will always take place with a selected breadth and width, in the best of cases, a number "n" of redundant bus-associated reserve conductors ready to take over the signal exchange should one or more of the bus conductors used give indication that an error has occurred.

Maintenance logic, or a control circuit 40, belonging to another circuit board or to each circuit board, is designed to program an FPID circuit at regular intervals, so that different bus-related conductors among all available conductors will be used. This procedure also enables the temporary use of those bus conductors which were earlier assigned as redundant conductors or reserve conductors.

In the case of such procedure, it is highly probable that these reserve conductors will function when a bus conductor or one of the drive circuits in an operative conductor breaks down and the use of one or more reserve conductors is required for a redundant function and the earlier used conductor is by-passed via the control unit 40 and the SRAM memory.

The described test procedure illustrated in FIG. 6 can be implemented during normal signal exchange, and when a parity bit or a check sum is not received correctly, the test procedure is able to ascertain which bus conductor and/or which transmitter/receiver circuit is at error and by-pass this conductor in preference to an available reserve conductor.

The reliability of all conductors can be tested automatically, by passing cyclically around all conductors (m+n).

When certain transmitter/receiver circuits are of one kind, the invention enables these circuits to be grouped with certain ones as reserve conductors and the test procedure can be carried out within groups.

Should certain other transmitter/receiver circuits be of another kind, these circuits may be similarly grouped and a test procedure carried out within this group.

Thus, the conductors 121 and 122 may belong to a first group including the reserve conductor 126, and the conductors 123–125 can belong to a second group which includes the reserve conductor 127.

The described test procedure requires a control, such as a parity control, and consequently the circuit 103a may sense the signal structure of transmitted signals and the circuit 113a may sense the signal structures of received signals.

When a discrepancy is detected, the circuit 40 is activated to ascertain which connection conductor is at error.

FIG. 5 is intended to illustrated a test procedure which requires normal signal transmission to be disconnected from the bus conductors.

In the illustrated embodiment, the FPID circuits 103, 113 are provided with a loop-related test circuit 403, 413 in accordance with IEEE Standard 1149.1, thereby enabling test routines to be used during a brief interruption in operation, these routines being executed when the load on the system is low, so as to thoroughly check through the "m+n" conductors of the parallel bus, including conductor drivers and receivers.

This will guarantee that the bus connections between two FPID circuits will always function.

The practical application of this control requires the connection of a suitable test pattern to the circuit 103 and thereafter reading the pattern present on the inputs of said circuit 113.

The choice of which circuit pattern is to be plucked into a loop can be controlled from a unit 42 which is able to communicate via standardized protocol over the control unit 40.

The invention also enables all or parts of the monitoring circuit to be related to the backplane.

There is nothing to prevent the application to the contacts of a backplane a circuit board which includes transmitter/receiver circuits and FPID circuits which, in turn, can coact with standardized circuit boards.

Furthermore, as shown in FIG. 5, the FPID circuit 103, 113 may be duplicated 103', 113' to obtain a greater error tolerance.

The test procedure illustrated in FIG. 5 may advantageously be used between a plurality of circuit boards, such as in a sequential structure.

The tests protocol used with the embodiment shown in FIG. 5 is known to the art and will not therefore be described in detail.

However, the bus-related conductors (m+n) shall be supplied with an unambiguous signal structure via the circuit 103, and a signal structure created thereby and received via the circuit 113 is also unambiguously specific.

In the event of a discrepancy, the conductor or conductors on which the error occurs is ascertained in a known manner.

In both the embodiment of FIG. 4 and the embodiment of FIG. 5, when the reserved conductors are the reserve conductors of a bus arrangement, these conductors can be used as the carriers of other signals than bus-related signals, such as parity control signals, etc.

It will be understood that the invention is not restricted to the aforedescribed and illustrated embodiments and that modifications can be made within the scope of the invention concept as defined in the following Claims.

I claim:

1. A magazine related bus arrangement for exchanging signals between a first printed circuit board assembly and a second printed circuit board assembly, comprising:
    a back plane having contact fields and means for holding a plurality of printed board assemblies in electrical connection with the contact fields;
    a bus structure including required conductors and a plurality of reserve conductors, wherein the number of reserve conductors is only slightly larger than the number of required conductors; and
    monitoring circuits operational to detect one or more errors in the signals exchanged on the required conductors and to switch an electrical signal path from a required conductors to a reserve conductor when an error is detected on the required conductor.

2. A magazine related bus arrangement according to claim 1, wherein:
    the back plane contact fields include a plurality of contact springs adapted to connect with a contact surface at the edge of a printed circuit board assembly.

3. A magazine related bus arrangement according to claim 1, wherein:
    when signals over a required conductor are disconnected, monitoring circuits on a first circuit board generate and send a predetermined signal structure over the required conductor and monitoring circuits on a second circuit board receive the signal.

4. A magazine related bus arrangement according to claim 3, wherein:
    when an error is confirmed in the received signal, the monitoring circuits bypass the required conductor using an available reserve conductor, thereby providing an error-tolerant exchange of signals.

5. A magazine related bus arrangement according to claim 1, wherein:
    the number of reserve conductors is a function of a parameter selected from the following group of parameters: error functions, error types and required level of security.

6. A magazine related bus arrangement according to claim 1, wherein:
    the number of reserve conductors is greater than one and less than 30% of the number of required conductors.

7. A magazine related bus arrangement according to claim 1, wherein:
    the number of reserve conductors corresponds to, or slightly exceeds, the number of conductors that are arranged in a capable.

8. A magazine related bus arrangement according to claim 1, wherein:
    the number of reserve conductors, exceeding the required number of conductors, is less than twenty.

9. A magazine related bus arrangement according to claim 1, wherein:
    the number of reserve conductors, exceeding the required number of conductors, is less than four.

10. A magazine related bus arrangement according to claim 1, wherein:
    the monitoring circuits are arranged to affect the connecting circuit that belongs to a printed broad assembly or to a back plane.

11. A magazine related bus arrangement according to claim 10, wherein:
    the connecting circuits is an FPID circuit.

12. A magazine related bus arrangement according to claim 10, wherein:
    any given connection of the I/O cells that belong to the connecting circuit is storable in a memory circuit that is reconfigurable by a control unit during operation.

13. A magazine related bus arrangement according to claim 1 wherein:
    the bus conductors used with a non error-tolerated exchange of signals are circulated among the total number of available bus-related conductors.

14. A magazine related bus arrangement according to claim 1, wherein:
    the reserve conductors can be used to exchange non-critical signals.

15. A magazine related bus arrangement according to claim 1, wherein:
    the connecting circuit is fully redundant.

16. A magazine related bus arrangement for exchanging signals between a first printed circuit board assembly and a second printed circuit board assembly, comprising:
    a back plane having contact fields and means for holding a plurality of printed board assemblies in electrical connection with the contact fields;
    a bus structure including required conductors and a plurality of reserve conductors, wherein the number of reserve conductors is only slightly larger than the number of required conductors; and
    monitoring circuits operational to test all conductors by transmitting a sequence of signals over the bus structure and to detect one or more errors in the signals exchanged on the required conductors and to switch an electrical signal path from a required conductor to a reserve conductor when an error is detected on the required conductor.

17. A magazine related bus arrangement according to claim 16, wherein:
the back plane contact fields include a plurality of contact springs adapted to connect with a contact surface at the edge of a printed circuit board assembly.

18. A magazine related bus arrangement according to claim 16, wherein:
the monitoring circuit is operational to detect the behavior of signal exchanges on the required conductors and, when an error is confirmed in a detected signal message on a required conductor, the required conductor is disconnected and an available reserve conductor is connected in its place, thereby providing an error-tolerant exchange of signals across the bus.

19. A magazine related bus arrangement according to claim 16, wherein:
the number of reserve conductors function of a parameter selected from the following group of parameters; error functions, error types and required level of security.

20. A magazine related bus arrangement according to claim 16, wherein:
the number of reserve conductors is greater than one and less than 30% of the number of required conductors.

21. A magazine related bus arrangement according to claim 16, wherein:
the number of reserve conductors corresponds to, or slightly exceeds, the number of conductors that are arranged in a capsule.

22. A magazine related bus arrangement according to claim 16, wherein:
the number of reserve conductors, exceeding the required number of conductors, is less than twenty.

23. A magazine related bus arrangement according to claim 16, wherein:
the number of reserve conductors, exceeding the required number of conductors, is less than four.

24. A magazine related bus arrangement according to claim 16, wherein:
the monitoring circuits are arranged to affect the connecting circuit that belongs to a printed board assembly or to a back plane.

25. A magazine related bus arrangement according to claim 24, wherein:
the connecting circuit is an FPID circuit.

26. A magazine related bus arrangement according to claim 24, wherein:
any given connection of the I/O cells that belong to the connecting circuits is storable in a memory circuit that is reconfigurable by a control unit during operation.

27. A magazine related bus arrangement according to claim 16, wherein:
the bus conductors used with a non error-tolerant exchange of signals are circulated among the total number of available conductors.

28. A magazine related bus arrangement according to claim 16, wherein:
the reserve conductors can be used to exchange non-critical signals.

29. A magazine related bus arrangement according to claim 16, wherein:
the connecting circuit is fully redundant.

30. A magazine related bus arrangement for exchanging signals between a first printed circuit board assembly and a second printed circuit board assembly, comprising:
a back plane having contact fields and means for holding a plurality of printed board assemblies in electrical connection with the contact fields;
a bus structure including required conductors and a plurality of reserve conductors, wherein the number of reserve conductors is only slightly larger than the number of required conductors; and
monitoring circuits operational to generate and transmit a predetermined signal structure on the bus structure and receive the transmitted signal structure and, when an error is detected on one of the required conductors, to bypass the required conductor by using an available reserve conductor when, thereby providing an error-tolerant exchange of information signals.

31. A magazine related bus arrangement according to claim 30, wherein:
the back plane contact fields include a plurality of contact springs adapted to connect with a contact surface at the edge of a printed circuit board assembly.

32. A magazine related bus arrangement according to claim 30, wherein:
the monitoring circuit is operational to detect the behavior of signal exchanges on the required conductors and, when an error is confirmed in a detected signal message on a required conductor, the required conductor is disconnected and an available reserve conductor is connected in its place, thereby providing an error-tolerant exchange of signals across the bus.

33. A magazine related bus arrangement according to claim 30, wherein:
the number of reserve conductors is adapted to a parameter selected from the following group of parameters; error functions, error types and required level of security.

34. A magazine related bus arrangement according to claim 30, wherein:
the number of reserve conductors is greater than one and less than 30% of the number of required conductors.

35. A magazine related bus arrangement according to claim 30, wherein:
the number of reserve conductors corresponds to, or slightly exceeds, the number of conductors that are arranged in a capsule.

36. A magazine related bus arrangement according to claim 30, wherein:
the number of reserve conductors, exceeding the required number of conductors, is less than twenty.

37. A magazine related bus arrangement according to claim 30, wherein:
the number of reserve conductors, exceeding the required number of conductors, is less than four.

38. A magazine related bus arrangement according to claim 30, wherein:
the monitoring circuits are arranged to affect the connecting circuit that belongs to a printed board assembly or to a back plane.

39. A magazine related bus arrangement according to claim 38, wherein:

the connecting circuit is an FPID circuit.

40. A magazine related bus arrangement according to claim 38, wherein:

any given connection of the I/C cells that belong to the connecting circuit is storable in a memory circuit that is reconfigurable by a control unit during operation.

41. A magazine related bus arrangement according to claim 30, wherein:

the bus conductors used with a non error-tolerant exchange of signals are circulated among the total number of available bus conductors.

42. A magazine related bus arrangement according to claim 30, wherein:

the reserve conductors can be used to exchange non-critical signals.

43. A magazine related bus arrangement according to claim 30, wherein:

the connecting circuit is fully redundant.

\* \* \* \* \*